(12) United States Patent
Pacholski et al.

(10) Patent No.: US 9,395,442 B2
(45) Date of Patent: Jul. 19, 2016

(54) METHOD OF AND SYSTEM FOR ASSISTING A COMPUTER AIDED DISPATCH CENTER OPERATOR WITH DISPATCHING AND/OR LOCATING PUBLIC SAFETY PERSONNEL

(71) Applicant: MOTOROLA SOLUTIONS, INC, Schaumburg, IL (US)

(72) Inventors: Daniel J Pacholski, South Elgin, IL (US); Anthony R Metke, Naperville, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 21 days.

(21) Appl. No.: 14/048,862

(22) Filed: Oct. 8, 2013

(65) Prior Publication Data

US 2015/0100233 A1    Apr. 9, 2015

(51) Int. Cl.
*G01S 19/17* (2010.01)
*G01S 19/39* (2010.01)
*G06Q 10/06* (2012.01)

(52) U.S. Cl.
CPC ............... *G01S 19/17* (2013.01); *G01S 19/39* (2013.01); *G06Q 10/0631* (2013.01)

(58) Field of Classification Search
CPC ....... H04W 64/00; H04W 24/00; G05D 1/02; G01S 3/02
See application file for complete search history.

(56) References Cited

U.S. PATENT DOCUMENTS

| | | | |
|---|---|---|---|
| 7,525,484 B2 * | 4/2009 | Dupray | G01S 1/026 342/450 |
| 7,561,101 B1 | 7/2009 | Tester et al. | |
| 8,275,649 B2 | 9/2012 | Zheng et al. | |
| 8,447,326 B2 * | 5/2013 | Huang | G01S 5/0263 370/338 |
| 8,635,023 B2 * | 1/2014 | Friedler | G01C 21/20 455/456.1 |
| 8,660,576 B2 * | 2/2014 | Huang | H04W 24/00 342/357.4 |
| 8,937,545 B2 * | 1/2015 | Kane | G06Q 10/10 340/539.11 |
| 2004/0179667 A1 | 9/2004 | Belcea | |
| 2010/0127887 A1 * | 5/2010 | Ledlie | G07C 9/00111 340/8.1 |
| 2012/0309428 A1 | 12/2012 | Marti et al. | |
| 2013/0079033 A1 | 3/2013 | Gupta et al. | |
| 2013/0166202 A1 * | 6/2013 | Bandyopadhyay | G01C 17/38 701/501 |

FOREIGN PATENT DOCUMENTS

| | | |
|---|---|---|
| WO | 2003045075 A2 | 5/2003 |
| WO | 2011080600 A1 | 7/2011 |
| WO | 2011117600 A1 | 9/2011 |
| WO | 2011157554 A1 | 12/2011 |

* cited by examiner

*Primary Examiner* — Thomas G Black
*Assistant Examiner* — Ana Thomas
(74) *Attorney, Agent, or Firm* — Daniel R. Bestor

(57) ABSTRACT

A computer aided dispatch (CAD) center operator can view a displayed location indicator indicative of a last location of a public safety (PS) device on a geographic information system (GIS) map, together with a displayed confidence indicator indicative of the likelihood that the displayed last location of the PS device is accurate, for use in dispatching a PS person to an incident scene, or locating the PS person.

18 Claims, 3 Drawing Sheets

METHOD OF AND SYSTEM FOR ASSISTING A COMPUTER AIDED DISPATCH CENTER OPERATOR WITH DISPATCHING AND/OR LOCATING PUBLIC SAFETY PERSONNEL

FIELD OF THE DISCLOSURE

The present disclosure relates generally to a method of, and a system for, assisting an operator at a computer aided dispatch (CAD) center of a public safety (PS) network with field dispatching and/or locating a PS person operating a mobile PS device, e.g., a handheld land mobile radio and/or a vehicular radio, by visually displaying on a geographic information system (GIS) map to the operator a confidence indicator indicative of the likelihood that a last location of the PS device displayed on the map is accurate.

BACKGROUND

In an emergency or like incident, public safety (PS) personnel, such as police officers, firefighters, paramedics, emergency medical service technicians, disaster relief workers, military rescue personnel, and like first responders, are typically dispatched by an operator at a computer aided dispatch (CAD) center to an incident scene to respond to remedy the emergency. These PS personnel typically utilize and operate PS communication devices, both handheld and vehicle-portable, while working in the field. PS communication devices include, for example, land mobile radios (LMRs), such as handheld radios and/or vehicular radios, along with built-in and remote accessories, such as global positioning satellite (GPS) sensors, microphones, speakers, earpieces, headsets, radio frequency (RF) transceivers, and the like, to support wireless, two-way, voice and data communications. These primary, mission-critical PS devices and the infrastructure to support their operation are typically operated by a PS server as part of a private, secure, and protected, proprietary PS network governed by a PS agency, e.g., a local government or department.

As advantageous as the known PS networks have been, there are circumstances where a more expedited and effective response strategy to the incident is needed. For example, it is known to display the last location of a PS device, typically with a radio icon, on a geographic information system (GIS) map that is displayed on a computer screen being viewed by the CAD center operator based on a GPS signal received from a GPS sensor on the PS device. It is also known to display a timestamp indicative of the last time that the GPS signal was received for the last displayed last location. The operator typically uses this information about the last location and the last time in order to dispatch a PS person, typically the nearest PS person, to the incident in the shortest time and by the most direct route. The operator may also use this information to locate a PS person, especially where the PS person has signaled that he or she is in need of assistance, and to send additional PS personnel to provide the assistance.

However, this location and time information may not accurately reflect the true current location of the PS device. The PS person may have gone in a venue indoors with the PS device, in which case the GPS signals may be at least partially and/or temporarily blocked. The PS person may be outdoors, but in an area in which the GPS signals may again be at least partially and/or temporarily blocked, e.g., by tall buildings. The CAD operator normally assumes that the displayed last location is accurate and up-to-date. However, in reality, the displayed last location is only accurate as of the last time that the GPS signal was received. Lack of true, up-to-date location information will eventually cause the CAD operator to lose confidence in the reliability and accuracy of the displayed last location and, as a result, will slow the determination of an effective response strategy to the incident and/or will slow any requested assistance.

Accordingly, there is a need for an improved system and method that will alleviate the aforementioned problems and enable a more expedited and more effective incident response strategy and/or assistance by giving the CAD operator an indication of the reliability of the displayed last location.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
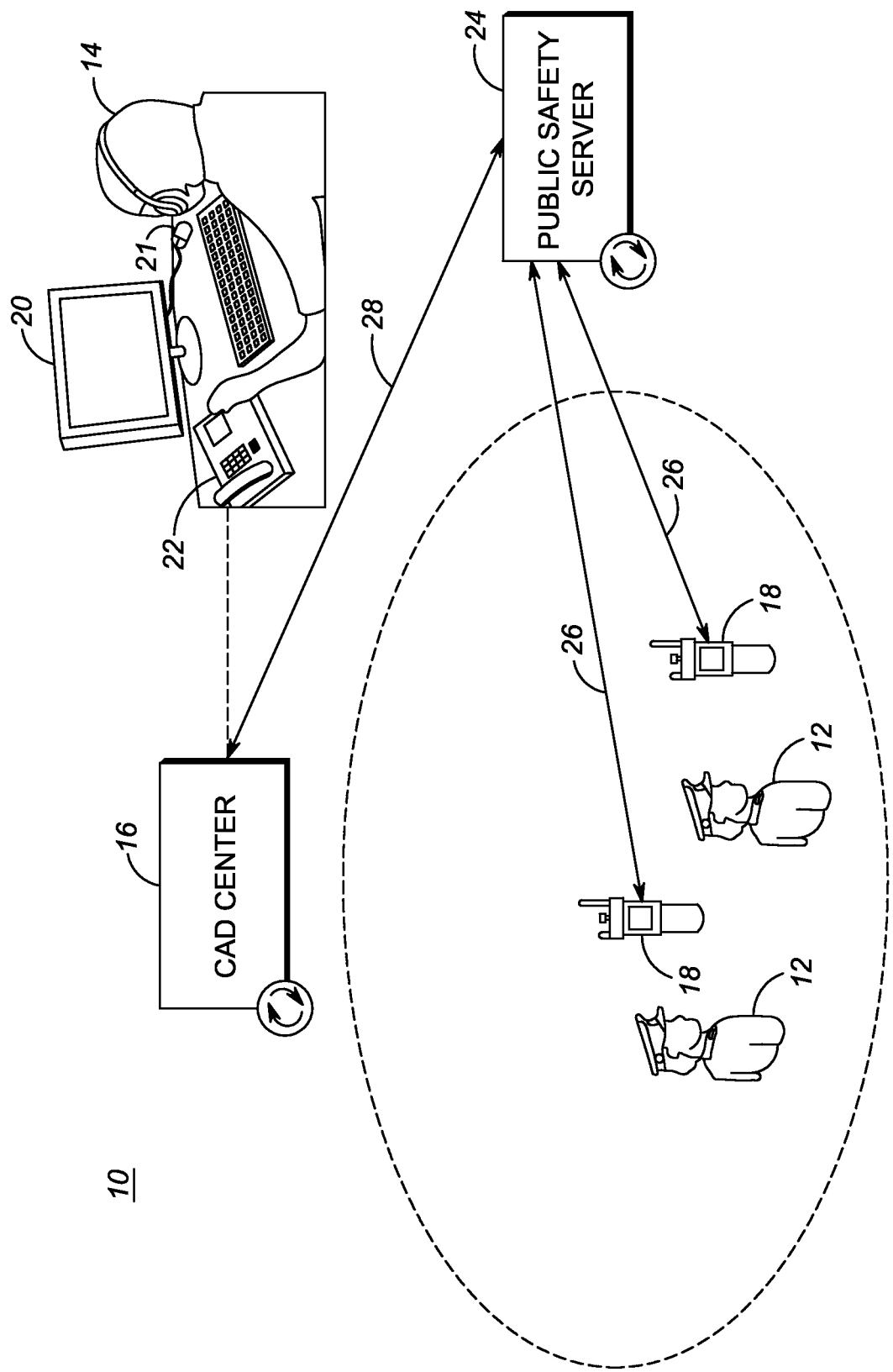
FIG. 1 is a pictorial, schematic view of a system for assisting an operator at a computer aided dispatch (CAD) center of a public safety (PS) network with field dispatching and/or locating at least one PS person operating a mobile PS device in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of assisting an operator at a computer aided dispatch (CAD) center of a public safety (PS) network with field dispatching and/or locating at least one PS person operating a mobile PS device, e.g., a handheld land mobile radio and/or a vehicular radio, having a global positioning satellite (GPS) sensor. The method is performed by visually displaying a location indicator indicative of a last location of the PS device on a geographic information system (GIS) map to the operator at the CAD center based on a GPS signal received from the GPS sensor on the PS device, and by visually displaying on the map a timestamp indicator indicative of a last time that the GPS signal was received for the displayed last location. The method is further performed by determining a likelihood or probability that the displayed last location of the PS device on the map is accurate, and by visually displaying on the map, typically in response to a manual action performed by the operator, a confidence indicator indicative of the determined likelihood that the displayed last location of the PS device on the map is accurate.

Advantageously, the confidence indicator is one or more of the following: an icon, an icon color, an icon size, an icon shadow color, an icon border color, an icon translucency, an alphanumeric text, an alphanumeric text color, a halo color, an indicator adjacent an icon, an indicator different in size from an adjacent icon, an indicator different in color from an adjacent icon, and a like indicator. Different confidence indicators may be used to indicate different levels of confidence.

The determining of the likelihood that the displayed last location of the PS device is accurate may be performed in various ways. For example, a measurement may be taken of how much time has elapsed since the last time indicated by the timestamp indicator. The greater the elapsed time, the less the likelihood is that the displayed last location is accurate. As another example, the GPS signal may be successively received in successive update time periods, and a measurement may be taken of how many update time periods have elapsed since the last time indicated by the timestamp indicator. The greater the number of elapsed update time periods, the less the likelihood is that the displayed last location is accurate.

As another example, a measurement may be taken of an average update time for a number of update time periods that occurred prior to the last time indicated by the timestamp indicator, and another measurement may be taken of how much time has elapsed since the last time indicated by the timestamp indicator. Then, a comparison is made between the elapsed time since the last time indicated by the timestamp indicator and the average update time. The number of update time periods used to obtain the average update time is selectable, and it is desirable that a rolling average update time be employed. As an additional example, a customized chronology of locations on the map at which a location update is expected to not be received is created. Preferably, this chronology is created by storing the locations where a given PS device previously stopped transmitting periodic location updates. For example, the PS person may frequent an indoor venue, e.g., a restaurant, every day between the hours of 12:00 PM and 1:00 PM to eat lunch, and this location and time information can be learned and stored in the PS network. At this venue, the PS device loses GPS connectivity, and its location update will be blocked. When determining the likelihood that the displayed last location of the PS device is accurate, a comparison is made between the displayed last location and the known locations in the chronology. If the displayed last location is at, or is within a predetermined distance of, a known location, then there is a greater likelihood that the displayed last location is accurate. If the likelihood falls below a predetermined threshold, then the last location update is stored.

A system, in accordance with another aspect of this disclosure, is operative for assisting an operator at a computer aided dispatch (CAD) center of a public safety (PS) network with field dispatching and/or locating a PS person operating a mobile PS device having a global positioning satellite (GPS) sensor. The system includes a PS server operative for visually displaying a location indicator indicative of a last location of the PS device on a geographic information system (GIS) map to the operator at the CAD center based on a GPS signal received from the GPS sensor on the PS device, and for visually displaying on the map a timestamp indicator indicative of a last time that the GPS signal was received for the displayed last location. The PS server is further operative for determining a likelihood that the displayed last location of the PS device on the map is accurate, and for visually displaying on the map a confidence indicator indicative of the determined likelihood that the displayed last location of the PS device on the map is accurate.

Turning now to the drawings, reference numeral 10 in FIG. 1 generally identifies a public safety (PS) network. In an emergency or like incident, public safety (PS) personnel 12, such as police officers, firefighters, paramedics, emergency medical service technicians, disaster relief workers, military rescue personnel, and like first responders, are typically dispatched by an operator 14 at a computer aided dispatch (CAD) center 16, also known as a call center, to an incident scene to respond to remedy the emergency. As illustrated, the operator 14 has access to, and operates, a computer having a screen or monitor 20, a mouse or analogous input device 21, and a telephone system 22.

These PS personnel 12 typically utilize and operate PS communication devices 18, both handheld and vehicle-portable, while working in the field. PS communication devices include, for example, handheld land mobile radios (LMRs), as illustrated in FIG. 1, and/or vehicular radios. Each mobile PS device 18 has built-in and remote accessories, such as one or more of the following: a global positioning satellite (GPS) sensor, a keyboard (real or electronic), a microphone, a speaker, an earpiece, a headset, an on-board memory and a microprocessor for storing and running applications and a mobile operating system, a display screen, a radio frequency (RF) transceiver, and the like, to support wireless, two-way, voice and data communications. These primary, mission-critical PS devices 18 and the infrastructure to support their operation are typically operated by a PS server 24 as part of the private, secure, and protected, proprietary PS network 10 governed by a PS agency, e.g., a local government or department. Each PS device 18 typically has a channel operating configuration during communications over the PS network 10. Each PS device 18 communicates via its RF transceiver with the PS server 26 over a bidirectional wireless link 26. The PS server 26 communicates with the CAD center 16 over a bidirectional wireless or wired link 28.

Figure 2:
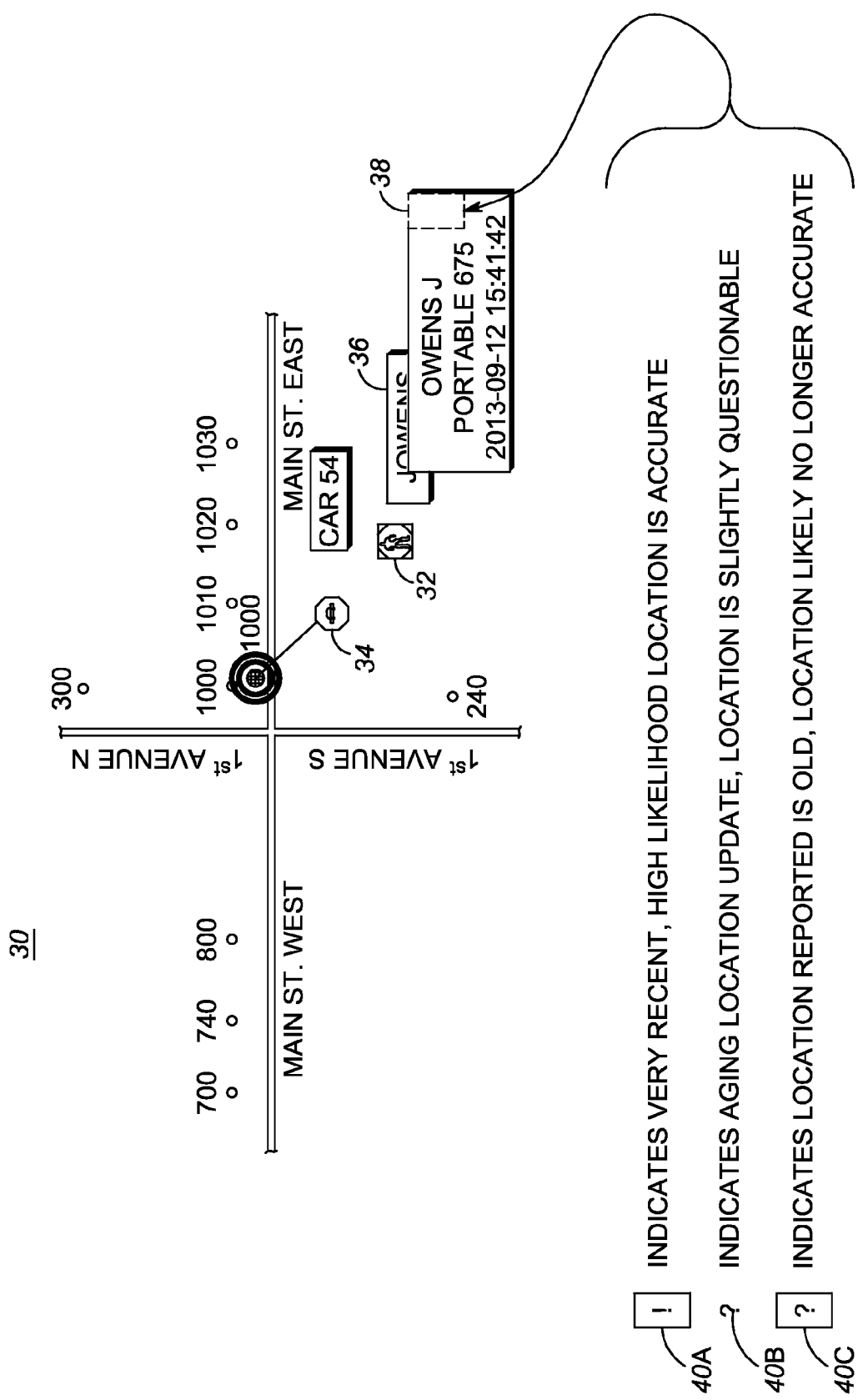
FIG. 2 is an enlarged view of a geographic information system (GIS) map that is displayed on a computer screen being viewed by the CAD center operator of FIG. 1 on which various indicators are set forth in accordance with the present disclosure.

As illustrated in FIG. 2, a representative geographic information system (GIS) map 30 is displayed on the computer screen 20 viewed by the operator 14 at the CAD center 16. Each location of a representative PS device 18 is displayed on the map 30 each time that a GPS signal is received from a GPS sensor on the PS device 18. For example, a figurine icon 32 indicative of one location of a PS device held by a PS person 12 is shown in FIG. 2, as well as a vehicle icon 34 indicative of another location of a PS device mounted in a vehicle that transported the PS person 12. Icons 34, 32 depict successive, physically different, locations over which the PS person 12 has traveled.

In response to manual input by the operator 14, for example, positioning and hovering a cursor over the last icon 32 on the computer screen 20 by using the mouse 21, a data box 36 opens on the screen 20 and displays such information as the name of the PS person 12 associated with the PS device 18, the identity or serial number of the PS device 18, and a timestamp indicative of the time that the GPS signal was received for the displayed last location as exemplified by the icon 32. The operator 14 typically uses this last location and time information in order to dispatch a PS person 12, typically the nearest PS person, to the incident in the shortest time and by the most direct route, and/or to locate the PS person 12 in the event that assistance has been requested.

However, as explained above, this last location and time information may not accurately reflect the true current location of the PS device 18. The PS person 12 may have gone in a venue indoors with the PS device 18, in which case the GPS signals may be at least partially and/or temporarily blocked. The PS person 12 may be outdoors, but in an area in which the GPS signals may again be at least partially and/or temporarily blocked, e.g., by tall buildings. The CAD operator 14 normally assumes that the last displayed location, e.g., icon 32, is accurate and up-to-date. However, in reality, the displayed location of icon 32 is only accurate as of the last time that the GPS signal was received. Lack of true, up-to-date, last location information will eventually cause the CAD operator 14 to lose confidence in the reliability and accuracy of the displayed last location and, as a result, will slow the determination of an effective response strategy to the incident and/or will slow assistance.

In accordance with this disclosure, the PS server 24 determines, as detailed below, a likelihood, or probability, that the last location of the PS device 12 displayed on the map 30 is accurate, and visually displays on the map 30 a confidence indicator 40A, or 40B, or 40C indicative of the determined likelihood that the last location of the PS device 18 displayed on the map 30 is accurate. More particularly, the confidence indicator 40A, or 40B, or 40C is viewable in a field 38 of the data box 36. The confidence indicator 40A, or 40B, or 40C can be displayed in response to the above-described manual action via the mouse 21 performed by the operator 14, or automatically, together with automatic periodic updates.

Advantageously, the confidence indicator 40A, or 40B, or 40C is one or more of the following: an icon, an icon color, an icon size, an icon shadow color, an icon border color, an icon translucency, an alphanumeric text, an alphanumeric text color, a halo color, an indicator adjacent an icon, an indicator different in size from an adjacent icon, an indicator different in color from an adjacent icon, and a like indicator. Different confidence indicators may be used to indicate different levels of confidence.

As shown in FIG. 2, by way of non-limiting example, confidence indicator 40A is an exclamation point within a green-colored box to indicate that there is a very high confidence that the displayed last location of the PS device 18 is accurate; confidence indicator 40B is a question mark to indicate that there is a medium confidence that the displayed last location of the PS device 18 is accurate; and confidence indicator 40C is a question mark within a red-colored box to indicate that there is a very low confidence that the displayed last location of the PS device 18 is accurate. As another non-limiting example, the confidence indicators may be expressed in numbers or percentages. Thus, if there is a very low confidence that the displayed last location of the PS device 18 is accurate, then the confidence indicator may be a number between 0.0 (0%) and 0.33 (33%); if there is a medium confidence that the displayed last location of the PS device 18 is accurate, then the confidence indicator may be a number between 0.33 (33%) and 0.66 (66%); and if there is a very high confidence that the displayed last location of the PS device 18 is accurate, then the confidence indicator may be a number between 0.66 (66%) and 1.0 (100%);

The determining of the likelihood that the displayed last location of the PS device 18 is accurate may be performed in various ways. For example, a measurement may be taken of how much time has elapsed since the last time indicated by the timestamp indicator. The greater the elapsed time, the less the likelihood is that the displayed last location is accurate. As another example, the GPS signal may be successively received in successive update time periods, and a measurement may be taken of how many update time periods have elapsed since the last time indicated by the timestamp indicator. The greater the number of elapsed update time periods, the less the likelihood is that the displayed last location is accurate.

By way of non-limiting numerical example, the likelihood or probability (PCL) that the displayed last location is correct may be made by calculating the following equation: PCL=(N−UPC)/N, where N is an arbitrary reference count, and UPC is the number of update periods that have elapsed since the last update was received. Assuming that N=10, and that UPC=2 (two update periods have elapsed since the last update), then PCL=(10−2)/10, and PCL=0.8, thereby indicating that there is an 80% likelihood that the displayed last location is correct. If nine update periods have elapsed since the last update, then PCL=0.1 or there is a 10% likelihood that the displayed last location is correct.

As another example, a measurement may be taken of an average update time for a number of update time periods that occurred prior to the last time indicated by the timestamp indicator, and another measurement may be taken of how much time has elapsed since the last time indicated by the timestamp indicator. Then, a comparison is made between the elapsed time since the last time indicated by the timestamp indicator and the average update time. The number of update time periods used to obtain the average update time is selectable, and it is desirable that a rolling average update time be employed.

As a further example, rather than using time, a measurement may be taken of the difference in distance between successive displayed locations, and a number of these distance differentials may be averaged to obtain an average distance differential. The number of distance differentials used to obtain the average distance differential is selectable, and it is desirable that a rolling average distance differential be employed. Then, a comparison is made between the rolling average distance differential and the last distance differential.

As an additional example, a customized chronology or history of locations on the map 30 at which a location update is expected to not be received is created. Preferably, this chronology is created by storing the locations where a given PS device 18 previously stopped transmitting periodic location updates. For example, the PS person 12 may frequent an indoor venue, e.g., a restaurant, every day between the hours of 12:00 PM and 1:00 PM to eat lunch, and this location and time information can be learned and stored in the PS network 10. At this venue, the PS device 18 loses GPS connectivity with the PS network 10, and its location update will be blocked. When determining the likelihood that the displayed last location of the PS device 18 is accurate, a comparison is made between the displayed last location and the known locations in the chronology. If the displayed last location is at, or is within a predetermined distance of, a known location, then there is a greater likelihood that the displayed last location is accurate.

As an additional example, the determination of the likelihood that the displayed last location of the PS device 18 is accurate may take into consideration the type of the PS device, i.e., whether it is a handheld device or a vehicular device.

Figure 3:
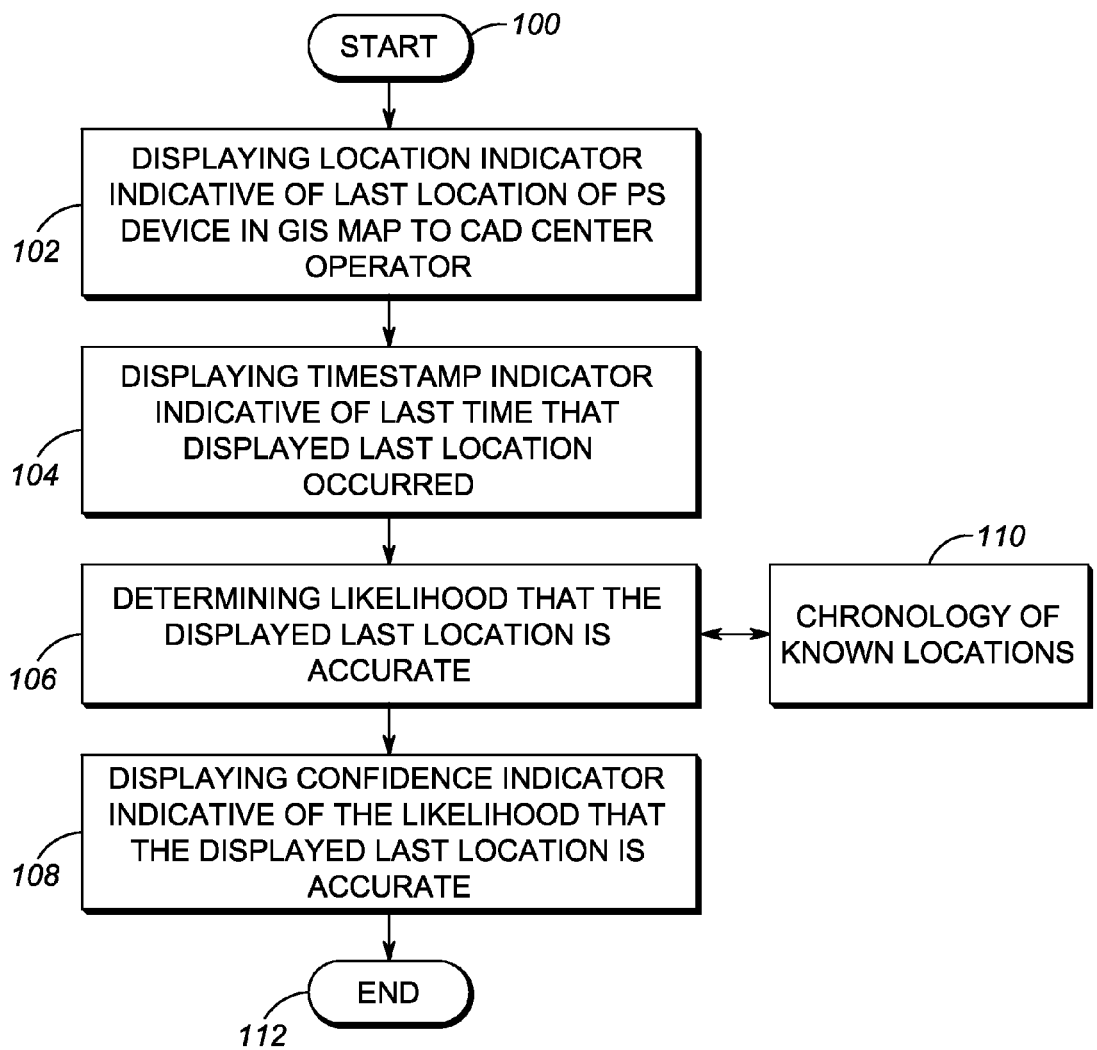
FIG. 3 is a flow chart, wherein various steps of the method of assisting the operator in FIG. 1 are set forth.

Turning now to the flow chart of FIG. 3, a method of assisting the operator 14 at the CAD center 16 of the public safety (PS) network 10 with field dispatching and/or locating at least one PS person 12 operating the mobile PS device 18 having a global positioning satellite (GPS) sensor, is performed, starting at start step 100, by visually displaying a location indicator 32 indicative of a last location of the PS device 18 on the map 30 to the operator 14 at the CAD center 16 based on a GPS signal received from the GPS sensor on the PS device 18 at step 102, and by visually displaying on the map 30 a timestamp indicator indicative of a last time that the GPS signal was received for the displayed last location at step 104. At step 106, the PS server 24 determines a likelihood that the displayed last location of the PS device 18 is accurate. For example, this can be determined by accessing a chronology database of known locations and times at step 110. At step 108, the PS server 24 visually displays on the map 30 a confidence indicator 40A, or 40B, or 40C indicative of the determined likelihood that the displayed last location of the PS device 18 on the map 30 is accurate. The method ends at step 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of assisting an operator at a computer aided dispatch (CAD) center of a public safety (PS) network with field dispatching or locating a PS person operating a mobile PS device having a global positioning satellite (GPS) sensor, the method comprising:
   visually displaying, by a PS server, a location indicator indicative of a last GPS location transmitted by the PS device, and received at the PS server, on a geographic information system (GIS) map at the PS server;
   visually displaying, by the PS server, on the GIS map a timestamp indicating a last time that the displayed last GPS location of the PS device was transmitted for the displayed last GPS location of the PS device;
   calculating, by the PS server, a level of confidence that the displayed last GPS location transmitted by the PS device is accurate and can be relied upon as a function of how much time has elapsed since the time indicated by the timestamp; and
   visually displaying, by the PS server, on the GIS map a confidence indicator indicative of the calculated level of confidence that the displayed last GPS location transmitted by the PS device and displayed on the GIS map is accurate and can be relied upon.

2. The method of claim 1, wherein the calculating consists of measuring, by the PS server, how much time has elapsed since the last time indicated by the timestamp.

3. The method of claim 1, further comprising, prior to the calculating, receiving, by the PS server, a plurality of GPS location updates from the PS device at regular update time periods;

wherein the calculating is performed by measuring, by the PS server, how many regular update time periods have been missed during the time that has elapsed since the time indicated by the timestamp.

4. The method of claim 1, further comprising prior to the calculating, receiving, by the PS server, a plurality of GPS location updates from the PS device;

wherein the calculating is performed by calculating, by the PS server, an average update time interval for the plurality of GPS location updates from the PS device and by comparing, by the PS server, the time that has elapsed since the time indicated by the timestamp with the average update time interval.

5. The method of claim 1, further comprising, prior to the calculating, receiving, by the PS server, a plurality of GPS location updates from the PS device and creating, by the PS server based on the plurality of GPS location updates, a customized chronology of known locations at which a location update is expected to not be received from the PS device due to historical failures by the PS device to transmit location updates at those known locations, and wherein the calculating is performed by comparing, by the PS server, the displayed last GPS location with the locations in the chronology at which a location update is not expected to be received from the PS device during the time that has elapsed since the time indicated by the timestamp.

6. The method of claim 1, wherein the displaying of the confidence indicator is performed by displaying, by the PS server and as a function of the calculated likelihood, one of: a particular icon associated with the calculated likelihood out of a plurality of icons associated with different calculated likelihoods, a particular icon color associated with the calculated likelihood out of a plurality of icon colors associated with different calculated likelihoods, a particular icon size associated with the calculated likelihood out of a plurality of icon sizes associated with different calculated likelihoods, a particular icon shadow color associated with the calculated likelihood out of a plurality of icon shadow colors associated with different calculated likelihoods, a particular icon border color associated with the calculated likelihood out of a plurality of icon border colors associated with different calculated likelihoods, and a particular icon translucency associated with the calculated likelihood out of a plurality of icon translucencies associated with different calculated likelihoods.

7. The method of claim 1, wherein the displaying of the confidence indicator is performed by displaying different confidence indicators in dependence on different levels of the calculated level of confidence, and wherein the different confidence indicators are displayed over the time that has elapsed since the time indicated by the timestamp for the displayed last GPS location transmitted.

8. The method of claim 1, wherein the displaying of the confidence indicator is performed in response to a detected action taken by the operator comprising placing a cursor over the location indicator indicative of the last GPS location transmitted by the PS device.

9. The method of claim 1, further comprising upon request or periodically automatically re-calculating during the time that has elapsed since the time indicated by the timestamp, by the PS server, the likelihood that the displayed last GPS location transmitted by the PS device is accurate and can be relied upon, and visually displaying, by the PS server, on the GIS map an updated confidence indicator different from the confidence indicator and indicative of the re-calculated likelihood that the displayed last GPS location transmitted by the PS device and displayed on the GIS map is accurate and can be relied upon.

10. A system for assisting an operator at a computer aided dispatch (CAD) center of a public safety (PS) network with field dispatching or locating a PS person operating a mobile PS device having a global positioning satellite (GPS) sensor, the system comprising:

a PS server operative for visually displaying a location indicator indicative of a last GPS location transmitted by the PS device, and received at the PS server, on a geographic information system (GIS) map at the PS server;

the PS server being further operative for visually displaying on the GIS map a timestamp indicating a last time that the displayed last GPS signal of the PS device was transmitted for the displayed last GPS location of the PS device;

the PS server being further operative for calculating a level of confidence that the displayed last GPS location transmitted by the PS device on the GIS map is accurate and can be relied upon as a function of how much time has elapsed since the time indicated by the timestamp; and the PS server being further operative for visually displaying on the GIS map a confidence indicator indicative of the calculated level of confidence that the displayed last GPS location transmitted by the PS device and displayed on the GIS map is accurate.

11. The system of claim 10, wherein the PS server being further operative for calculating the level of confidence consists of the PS server measuring how much time has elapsed since the last time indicated by the timestamp.

12. The system of claim 10, wherein the PS server being further operative for calculating the level of confidence comprises the PS server receiving, prior to the calculating, a plurality of GPS location updates from the PS device at regular update time periods, and measuring how many regular update time periods have been missed during the time that has elapsed since the time indicated by the timestamp.

13. The system of claim 10, wherein the PS server being further operative for calculating the level of confidence comprises the PS server receiving, prior to the calculating, a plurality of GPS location updates from the PS device, measuring an average update time interval for the plurality of GPS location updates from the PS device, and comparing the time that has elapsed since the time indicated by the timestamp with the average update time interval.

14. The system of claim 10, wherein the PS server being further operative for calculating the level of confidence comprises the PS server receiving, prior to the calculating, a plurality of GPS location updates from the PS device and creating, based on the plurality of GPS location updates, a customized chronology of known locations at which a location update is expected to not be received from the PS device due to historical failures by the PS device to transmit location updates at those known locations, and comparing the displayed last GPS location with the locations in the chronology at which a location update is not expected to be received from the PS device during the time that has elapsed since the time indicated by the timestamp.

15. The system of claim 10, wherein the PS server is further operative for displaying, as a function of the calculated likelihood, one of: a particular icon associated with the calculated likelihood out of a plurality of icons associated with different calculated likelihoods, a particular icon color associated with the calculated likelihood out of a plurality of icon colors associated with different calculated likelihoods, a particular icon size associated with the calculated likelihood out of a plurality of icon sizes associated with different calculated likelihoods, a particular icon shadow color associated with the calculated likelihood out of a plurality of icon shadow colors associated with different calculated likelihoods, a particular icon border color associated with the calculated likelihood out of a plurality of icon border colors associated with different calculated likelihoods, and a particular icon translucency associated with the calculated likelihood out of a plurality of icon translucencies associated with different calculated likelihoods.

16. The system of claim 10, wherein the PS server is further operative for displaying different confidence indicators in dependence on different levels of the calculated level of confidence, and wherein the different confidence indicators are displayed over the time that has elapsed since the time indicated by the timestamp for the displayed last GPS location transmitted.

17. The system of claim 10, wherein the PS server is further operative for displaying the confidence indicator in response to a detected action performed by the operator comprising placing a cursor over the location indicator indicative of the last GPS location transmitted by the PS device.

18. The system of claim 10, wherein the PS server is further operative to upon request or periodically automatically re-calculate, during the time that has elapsed since the time indicated by the timestamp, the likelihood that the displayed last GPS location transmitted by the PS device is still accurate and can be relied upon, and visually display, on the GIS map an updated confidence indicator different from the confidence indicator and indicative of the re-calculated likelihood that the displayed last GPS location transmitted by the PS device and displayed on the GIS map is accurate and can be relied upon.

* * * * *